Nov. 14, 1933.   D. V. BOWEN   1,935,011
DESK STAND
Filed April 8, 1931
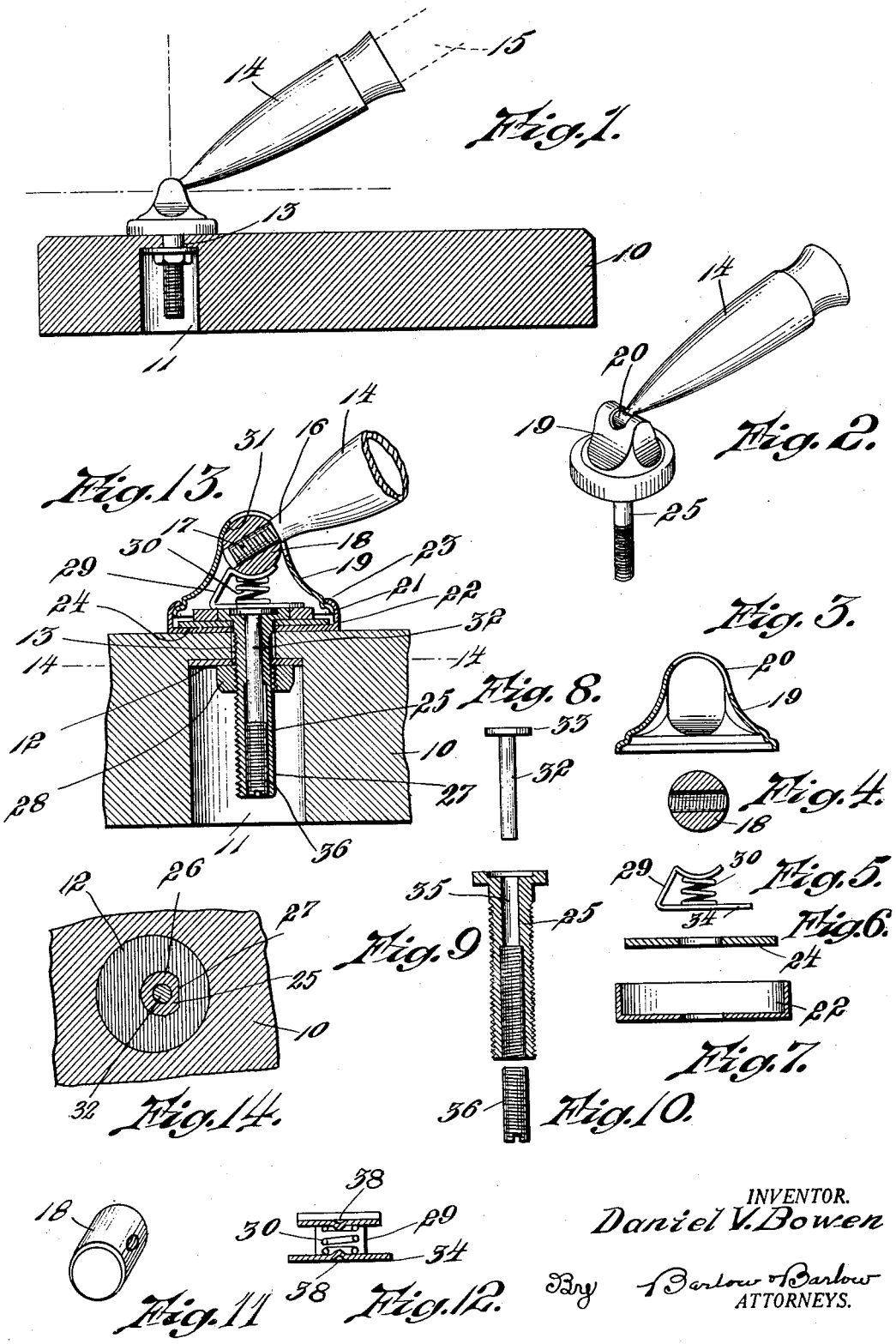
INVENTOR.
Daniel V. Bowen
By Barlow & Barlow
ATTORNEYS.

Patented Nov. 14, 1933

1,935,011

UNITED STATES PATENT OFFICE 1,935,011

DESK STAND

Daniel V. Bowen, Attleboro, Mass., assignor, by mesne assignments, to L. E. Waterman Company, New York, N. Y., a corporation of New York Application April 8, 1931. Serial No. 528,668

17 Claims. (Cl. 120—108)

This invention relates to an improved construction of desk stand for writing instruments; and has for its object to provide a sleeve for receiving the end portion of the writing instrument, the sleeve being mounted to receive universal movement and retained in any one of a variety of positions relative to the base which may be convenient for the user.

A further object of the invention is to provide friction means for retaining the instrument-carrying sleeve in any desired position and to provide adjustable means for regulating the amount of frictional resistance to the movement of the adjustable sleeve.

A still further object of the invention is to provide a cup member and secure it to the base and to rotatably mount a bearing shell in this cup member and to rotatably mount the head of the pen receiving sleeve member in this shell member, also to provide a screw adjustment for regulating the frictional tension upon the sleeve to support this sleeve in different adjusted positions with the writing instrument mounted therein.

With these and other objects and advantageous features in view, the invention consists of novel arrangements of parts more fully disclosed in the detailed description following, in conjunction with the accompanying drawing, and more particularly set forth in the appended claims.

In the drawing:

Fig. 1 is a side elevation, partly in section, showing my improved desk stand mounting with a portion of a pen shown in dotted lines in its holder;

Fig. 2 is a perspective view showing the pen-receiving sleeve and the member in which it is hingedly mounted as removed from the base;

Fig. 3 is a sectional view of the slotted rotatable bearing shell;

Fig. 4 is a section through the bearing trunnion;

Fig. 5 is a detail showing the resilient friction applying saddle member;

Fig. 6 is the reinforcing washer;

Fig. 7 is a sectional view of the cup member which rests upon and is fixed to the base;

Fig. 8 is the friction adjusting pin;

Fig. 9 is a tubular bolt that fixedly secures the cup member to the base;

Fig. 10 is the friction adjusting screw removed from the bolt;

Fig. 11 is a perspective view of the trunnion which forms the head of the pen-receiving sleeve;

Fig. 12 is a section of the spring saddle member which applies friction to this sleeve head;

Fig. 13 is a sectional view showing the parts assembled; and

Fig. 14 is a section on the line 14—14 of Figure 13, illustrating the eccentric washer which serves to lock the tubular bolt and the cup member against rotation on the base.

It is found in the practical construction and operation of desk stands of this character, of advantage to provide universal movement of the pen-receiving sleeve, to provide friction for retaining the sleeve in different adjusted positions and also to provide means for adjusting the amount of friction upon this bearing; and the following is a detailed description of the present embodiment of my invention and showing one arrangement of parts by which these advantageous results may be accomplished:

With reference to the drawing, 10 designates the base of the desk stand, which supports all of the operating parts. This base is herein shown as being provided with an opening 11 from its under side upward for the reception of the locking washer 12; also a hole 13 is shown from this recess through to the upper face of the base, which hole is offset from the center of the recess 11.

I have herein shown a sleeve 14 of substantially trumpet shape for the reception of the writing instrument which may be a pen or pencil 15, as herein illustrated in dotted lines. It is found of advantage to provide a universal movement, that is both up and down and a radial movement for the sleeve so that the writing instrument may be set in any convenient position for use, I have reduced the end portion 16 of this trumpet-shaped sleeve and threaded the same as at 17 into a cylindrical member 18 which forms a head or trunnion preferably T-shaped on which this sleeve member may be raised and lowered.

This trunnion is mounted in the bearing shell 19 and is slotted as at 20, the shell being shaped to receive the trunnion and the neck end 16 of the sleeve is arranged to extend out through this slot 20 to permit a raising and lowering movement of the sleeve.

In order to obtain a swiveling or laterally swinging motion of this bearing shell, I have formed the same in bell shape with its flaring edge 21 extending into the cup member 22, the edge 23 of the cup member being rolled inwardly or turned over that of the bearing shell so that the shell may be freely rotated in this cup.

In order to fix the cup against rotation to the base, I first insert a reinforcing washer 24 in the bottom recess of the cup, I then pass the tubular shank of bolt 25 down through this washer and the bottom of the cup through the offset hole 13 in the base into the chamber 11 thereof and on to the inner end of this bolt I insert the offset washer 12 which has a non-circular hole 26 shaped to fit the flattened side 27 of the bolt, whereby when this washer 12 is in the recess 11 of the base its flattened side engages the corresponding side of the bolt thereby locking the bolt against rotation which when the binding nut 28 is set up, securely binds and also fixes the cup 22 to the base against relative rotation.

On the head of this tubular bolt I mount a spring friction saddle member 29, between the upper and lower leaves of which saddle is mounted a coil swing 30, the upper plate of the saddle being arranged to press the trunnion member 18 up against its seat 31 on the inner side of the bearing shell. This coil is retained in position by the inset protuberances 38.

Owing to the differences in weights of pens used in this desk stand and the wearing or softening of the friction and the bearings, it is found of advantage to provide means for adjusting the amount or degree of frictional pressure of this saddle against the trunnion; and to accomplish this in a simple and effective way, I have mounted a presser pin 32 in the tubular bolt 25, the same being provided with a seat 33 which rests against the under plate 34 of the saddle member, the lower end of this pin extending into the hollow center 35 of the bolt 25 into position to be engaged by the adjusting screw 36 which is threaded into the lower end of this tubular bolt so that any desired degree of frictional pressure of the saddle against the head of the sleeve may be obtained. Also, it will be noted that inasmuch as the bearing shell 19 is rotatably mounted in the cup 22 that any adjustment of this screw 36 also affects the rotating friction of this shell member in its cup 22. Therefore by a single adjustment of the screw 36 both the raising and lowering friction of the sleeve and also the swiveling or axial pivoting of the shell in its cup are affected. By the use of my improved mechanism for adjustably supporting the writing instrument, any desired amount of friction may be obtained for either the raising or lowering or the rotating or pivoting motion of the parts.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A desk stand comprising a base, a cup member, a hollow bolt arranged to bind said cup member to said base, a bearing shell rotatably mounted in said cup member, a sleeve shaped to receive the end of a writing instrument and having a head rotatably mounted within said bearing shell, resilient means within the shell acting on said sleeve head for frictionally retaining the sleeve in different adjusted positions, a presser pin in said hollow bolt, and a screw arranged to act through said pin to regulate the action of said friction means upon the head of said sleeve.

2. A desk stand comprising a base, a bearing member, means for mounting said member on said base including a hollow bolt, a sleeve shaped to receive the end of a writing instrument and having a head rotatably mounted in said bearing member, frictional means within the member acting on said head for retaining the sleeve in different adjusted positions, a presser pin in said hollow bolt, and means for acting through said pin to regulate the action of said friction means upon the head of said sleeve.

3. A desk stand comprising a base, a cup member, a hollow bolt arranged to bind said cup member to said base, a bearing shell rotatably mounted in said cup member, a sleeve shaped to receive the end of a writing instrument and having a head rotatably mounted within said bearing shell, frictional means within the shell acting on said sleeve head for retaining the sleeve in different adjusted positions, a presser pin in said hollow bolt, and means for acting through said pin to regulate the action of said friction means upon the head of said sleeve.

4. A desk stand for a writing instrument, comprising a base, a hollow bearing member mounted thereon, a sleeve member for receiving the end portion of a writing instrument, a head member on said sleeve mounted in said bearing member, a strip of sheet stock having a portion fitting said head and folded upon itself to apply friction thereto, and a compression spring between the folds of said strip to assist the application of frictioning pressure thereto.

5. A desk stand for a writing instrument, comprising a base, a hollow bearing member mounted thereon, a sleeve member for receiving the end portion of a writing instrument, a head member on said sleeve mounted in said bearing member, a strip of sheet stock having a portion fitting said head and folded upon itself to apply friction thereto, and means for applying pressure to the opposite fold from that engaging the said head.

6. A desk stand for a writing instrument, comprising a base, a hollow bearing member mounted thereon, a sleeve member for receiving the end portion of a writing instrument, a head member on said sleeve mounted in said bearing member, a strip of sheet stock having a portion fitting said head and folded upon itself to apply friction thereto, and an auxiliary spring between the folds of said strip to assist the application of frictioning pressure thereto, and means for applying pressure to the opposite fold from that engaging the said head.

7. In a desk stand, a base, a sleeve for receiving a writing instrument, a swivel mounting for said sleeve comprising two portions, means for mounting one portion on said base against rotation comprising connecting bores of different diameters through said base, and eccentrically related with respect to each other, a shank secured to said non-rotatable portion and extending through the smaller bore, a washer fitting said larger bore and provided with an eccentric hole through which said shank extends, and means preventing rotation of said shank within said washer.

8. A desk stand for a writing instrument comprising a base, a bearing shell mounted on said base and having a horizontally extending cylindrical-shaped portion with a slot therein extending circumferentially thereof, a cylindrical member disposed within and fitting said cylindrical-shaped portion of the shell on opposite sides of said slot, a sleeve adapted to receive the end of a writing instrument and extending through said slot and secured to said member, a spring disposed beneath said member and acting between said member and said base to force said member upwardly against the inner surface of said cylindrical portion of the shell, and means to vary the force exerted by said spring upon said member.

9. A desk stand for a writing instrument comprising a base, a bearing shell mounted on said base and having a horizontally extending cylindrical-shaped portion with a slot therein extending circumferentially thereof, a cylindrical member disposed within and fitting said cylindrical-shaped portion of the shell on opposite sides of said slot, a sleeve adapted to receive the end of a writing instrument and extending through said slot and secured to said member, a spring disposed beneath said member and acting between said member and said base to force said member upwardly against the inner surface of said cylindrical portion of the shell, means to vary the force exerted by said spring upon said member, and means rotatably holding said shell on said base.

10. A desk stand for a writing instrument comprising a base, a bearing shell mounted on said base and having a horizontally extending cylindrical-shaped portion with a slot therein extending circumferentially thereof, a cylindrical member disposed within and fitting said cylindrical-shaped portion of the shell on opposite sides of said slot, a sleeve adapted to receive the end of a writing instrument and extending through said slot and secured to said member, a cup secured to said base and having an edge portion extending above the edge portion of the shell, a spring disposed beneath said member and acting between said member and said base to force said member upwardly against the inner surface of said cylindrical portion of the shell and thereby to force said edge portions of the cup and shell into engagement with each other, and means to vary the force exerted by said spring.

11. A desk stand for a writing instrument comprising a base having a hollow bearing member mounted thereon, a sleeve adapted to receive the end of a writing instrument and having a head disposed within said bearing member, a strip of sheet metal folded upon itself and having an upper leaf of the fold bearing against said head and a lower leaf of the fold bearing against the base, a pin passing through the base and adapted to force said lower leaf upwardly, and means to move said pin up or down, for the purpose set forth.

12. A desk stand for a writing instrument comprising a base, a cup on said base with a bottom supported thereby, a bearing shell rotatably mounted in said cup, a sleeve adapted to receive the end of a writing instrument and rotatably mounted in said shell, a bolt disposed in a hole in said base and having a head received within said cup and holding said bottom on said base, means yieldingly resisting rotation of said shell, and means carried by said bolt for adjusting said first-named means.

13. A desk stand for a writing instrument comprising a base, a cup on said base with a bottom supported thereby, a bearing shell rotatably mounted in said cup, a sleeve adapted to receive the end of a writing instrument and rotatably mounted in said shell, a bolt disposed in a hole in said base and having a head received within said cup and holding said bottom on said base, means yieldingly resisting rotation of said sleeve, and means carried by said bolt for adjusting said first-named means.

14. A desk stand for a writing instrument comprising a base, a cup on said base with a bottom supported thereby, a bearing shell rotatably mounted in said cup, a sleeve adapted to receive the end of a writing instrument and rotatably mounted in said shell, a bolt disposed in a hole in said base and having a head received within said cup and holding said bottom on said base, and means locking said bolt against rotation in said hole.

15. In a desk stand, a base, a sleeve for receiving a writing instrument, a swivel mounting for said sleeve comprising two portions, means for mounting one portion on said base against rotation comprising connecting bores of different diameters through said base and eccentrically related with respect to each other, a shank secured to said non-rotatable portion and extending through the smaller bore, a washer fitting said larger bore and provided with an eccentric hole through which said shank extends, and interengaging surfaces on said shank and washer preventing rotation of the washer relative to the shank.

16. In a desk stand, a base having a recess in the bottom thereof of less depth than the thickness of the base, said base also having a hole of materially smaller cross-section than said recess and extending from the top of the recess through the base to the top surface thereof, a sleeve to receive a writing instrument and disposed on top of said base, means to rotatably mount said sleeve on said base and comprising a bolt extending through said hole into said recess, a washer on said bolt within said recess and engaging the bottom thereof, means preventing rotation of the washer in the recess, means preventing rotation of the bolt in the washer, and a nut on the bolt forcing said washer into contact with the bottom of the recess.

17. In a desk stand, a base having a recess in the bottom thereof of less depth than the thickness of the base, said base also having a hole of materially smaller cross-section than said recess and extending from the top of the recess through the base to the top surface thereof, a sleeve to receive a writing instrument and disposed on top of said base, means to rotatably mount said sleeve on said base and comprising a bolt extending through said hole into said recess, said recess having a vertically extending cylindrical wall and said hole being located eccentrically with respect to said wall, a circular washer having an eccentric hole receiving said bolt and having a periphery contacting with the cylindrical wall of the recess, whereby rotation of the washer in the recess is prevented, and means preventing rotation of the bolt in the washer.

DANIEL V. BOWEN.